UNITED STATES PATENT OFFICE.

JOHN C. VANLOHE, OF BALTIMORE, MARYLAND.

BLEACHING RAW COTTON.

SPECIFICATION forming part of Letters Patent No. 297,319, dated April 22, 1884.

Application filed March 25, 1884. (No specimens.)

*To all whom it may concern:*

Be it known that I, JOHN C. VANLOHE, of the city of Baltimore and State of Maryland, have invented certain Improvements in the Art of Bleaching Raw Cotton, of which the following is a specification.

This invention relates to certain improvements in the art of bleaching raw cotton, as will hereinafter fully appear.

In the methods of bleaching raw cotton now practiced the compressed or baled cotton is first torn apart and brought to a fluffy or loose wool-like state, and then subjected while in that condition to the action of the bleaching-liquids. In the bleaching operation the loose cotton is massed or compressed by the action of the bleaching-liquids, and it has again to be torn apart and loosened before the drying process can be accomplished. As the bulk of the baled cotton is so much increased in the first loosening process, it is practically impossible to treat the loose raw material on a large scale in keirs; consequently the loose cotton is in some cases made fluffy, or formed into bats or into a sheet, which is fed to or passed through the bleaching-liquid and then dried.

My invention consists, broadly, in subjecting raw cotton in a compressed state, as in a bale, to the action of the bleaching-liquids.

In carrying out my invention I take a bale or a portion of a bale of cotton and place it while in the compressed state in a keir which is provided with a closely-fitting cover or lid. I then exhaust the air from the keir and admit cold bleaching-liquid. At the proper time the bleaching-liquid is withdrawn. The cotton is then rinsed in the keir and removed, after which it is loosened and dried.

From the foregoing it will be seen that during the entire process the cotton is only once brought to a loosened condition, instead of several times, as in the processes heretofore employed; consequently much handling of the cotton is dispensed with, and the fiber not broken or injured to the same extent as when it is several times manipulated. It will be understood that in each pulling or tearing apart of the mass of cotton the fiber is more or less injured and the value of the cotton reduced.

One advantage of bleaching compressed cotton is that much less bleaching-liquid is used and lost than when the cotton is in a loose mass, as the quantity of the liquid held in the cotton and rinsed out is practically in proportion to the bulk of the cotton treated.

I am aware that fibers and cloths have been bleached in a vacuum compressed between perforated plates or held in cages, as shown in German Patents Nos. 15,152, and 21,388; but

What I claim is—

The process herein described of bleaching raw cotton, which consists in first subjecting the cotton in a compressed state, as in a bale, to the action of bleaching-liquids, then rinsing the compressed and bleached cotton, then tearing the bleached and compressed cotton apart or loosening it, and then drying it, substantially as specified.

JOHN C. VANLOHE.

Witnesses:
DANL. FISHER,
CHAS. B. CASSADY.